United States Patent
Bono et al.

(10) Patent No.: US 9,280,555 B1
(45) Date of Patent: Mar. 8, 2016

(54) UNIFIED DATA PROTECTION FOR BLOCK AND FILE OBJECTS

(71) Applicant: EMC Corporation, Hopkinton, MA (US)

(72) Inventors: Jean-Pierre Bono, Westborough, MA (US); William Davenport, Burlington, MA (US); Miles A. de Forest, Bahama, NC (US); Philippe Armangau, Acton, MA (US); Walter C. Forrester, Berkeley Heights, NJ (US); Himabindu Tummala, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 179 days.

(21) Appl. No.: 13/853,508

(22) Filed: Mar. 29, 2013

(51) Int. Cl.
*G06F 17/30* (2006.01)

(52) U.S. Cl.
CPC .................. *G06F 17/30174* (2013.01)

(58) Field of Classification Search
CPC .............. G06F 17/30578; G06F 17/30067; H04L 29/0854
USPC ........... 707/201, 822, 609, 741, 613, 200, 10, 707/618, 692, 650, 654, 624; 711/202; 714/3, 6.32
See application file for complete search history.

(56) References Cited

U.S. PATENT DOCUMENTS

| | | | |
|---|---|---|---|
| 7,055,014 B1 * | 5/2006 | Pawlowski et al. | 711/202 |
| 7,383,463 B2 | 6/2008 | Hayden et al. | |
| 7,546,364 B2 | 6/2009 | Raman et al. | |
| 7,631,155 B1 | 12/2009 | Bono et al. | |
| 7,693,864 B1 * | 4/2010 | Pasupathy et al. | 707/999.102 |
| 7,769,722 B1 | 8/2010 | Bergant et al. | |
| 7,870,172 B1 * | 1/2011 | Sarma | 707/822 |
| 7,886,182 B1 * | 2/2011 | Coatney et al. | 714/3 |
| 8,285,758 B1 | 10/2012 | Bono et al. | |
| 8,433,869 B1 | 4/2013 | Natanzon et al. | |
| 8,706,833 B1 | 4/2014 | Bergant et al. | |
| 2004/0030668 A1 | 2/2004 | Pawlowski et al. | |
| 2005/0216788 A1 * | 9/2005 | Mani-Meitav | G06F 11/1456 714/6.32 |
| 2005/0228835 A1 * | 10/2005 | Roa | 707/204 |
| 2007/0136389 A1 * | 6/2007 | Bergant et al. | 707/201 |
| 2007/0244908 A1 * | 10/2007 | Rajan | 707/10 |
| 2009/0276593 A1 * | 11/2009 | Jacobson et al. | 711/162 |
| 2009/0313503 A1 * | 12/2009 | Atluri et al. | 714/19 |
| 2010/0070474 A1 * | 3/2010 | Lad | 707/624 |
| 2011/0289058 A1 * | 11/2011 | Anzai et al. | 707/650 |
| 2012/0123999 A1 * | 5/2012 | Ashutosh et al. | 707/618 |
| 2012/0124013 A1 * | 5/2012 | Provenzano | 707/692 |

(Continued)

OTHER PUBLICATIONS

"Configuring Virtual Data Movers on VNX™," EMC® VNX™ Series, Release 7.0, EMC Corporation, 1998, 80 pages.

(Continued)

*Primary Examiner* — Jeffrey A Burke
*Assistant Examiner* — Thong Vu
(74) *Attorney, Agent, or Firm* — BainwoodHuang

(57) ABSTRACT

A technique for protecting host data using, for example, snaps, asynchronous replication, and/or synchronous replication, includes storing both block-based objects and file-based objects in a common form—as files. With both block-based objects and file-based objects represented as the same type of underlying objects, data protection of both block-based and file-based objects is accomplished using a single set of data protection technologies, which are configured to perform data protection operations on files.

21 Claims, 14 Drawing Sheets

(56) References Cited

U.S. PATENT DOCUMENTS

| | | | |
|---|---|---|---|
| 2012/0278553 A1* | 11/2012 | Mudhiganti et al. | 711/114 |
| 2013/0080387 A1* | 3/2013 | Mohl et al. | 707/624 |
| 2013/0085999 A1* | 4/2013 | Tung et al. | 707/654 |

OTHER PUBLICATIONS

"Using EMC® Celerra Replicator™ (V2)," Celerra Network Server, Technical Module, Feb. 2009, 184 pages.

"EMC VNX and Virtual Data Mover (VDM) Replication," EMC Corporation, YouTube Video, http://www.youtube.com/watch?v=o7ng6268vkl, uploaded on Sep. 9, 2011.

"VNX Video: Virtual Data Mover (VDM) on the VNX," EMC Corporation, YouTube Video, http://www.youtube.com/watch?v=Mn1YjLa-qPo, uploaded on Aug. 11, 2011.

Bono, "Unified Datapath Architecture," U.S. Appl. No. 13/828,322, filed Mar. 14, 2013.

Bono, et al., "Unified Datapath Processing With Virtualized Storage Processors," U.S. Appl. No. 13/828,294, filed Mar. 14, 2013.

Bono, et al., "Automatically Creating Multiple Replication Sessions in Response to a Single Replication Command Entered by a User," U.S. Appl. No. 13/837,825, filed Mar. 15, 2013.

Bono, et al., "Unified Synchronous Replication for Block and File Objects," U.S. Appl. No. 14/041,176, filed Sep. 30, 2013.

Bono, et al., "Synchronous Replication of Virtualized Storage Processors," U.S. Appl. No. 14/041,191, filed Sep. 30, 2013.

Bono, et al., "Metro-Cluster Based on Synchronous Replication of Virtualized Storage Processors," U.S. Appl. No. 14/041,204, filed Sep. 30, 2013.

Bono, et al., "Unified Management of Sync and Async Replication for Block and File Objects," U.S. Appl. No. 14/041,238, filed Sep. 30, 2013.

EMC Corporation, "EMC Celerra Replicator," (http://chucksblog.emc.com/content/CelerraReplicator.pdf) 2008.

EMC Corporation, "EMC RecoverPoint Family," (http://www.emc.com/collateral/software/data-sheet/h2769-recoverpoint-ds.pdf) Aug. 2013.

EMC Corporation, "EMC Business Continuity and Disaster Recovery Solutions," (https://enterpriseportalcontent.mci.com/NR/rdonlyres/7A037904-A72F-4C79-BC21-4731442BFD9A/0/SoCDREventEMCReplicationRW.pdf) 2008.

EMC Corporation, "Array-Based Replication with EMC VPLEX," (http://www.emc.com/collateral/hardware/white-papers/h8005-array-based-replication-vplex-wp.pdf) Aug. 2010.

Bono, et al., "Unified Data Services for Block and File Objects," U.S. Appl. No. 13/853,284, filed Mar. 29, 2013.

Bono, et al., "Embedded Synchronous Replication for Block and File Objects," U.S. Appl. No. 14/139,036, filed Dec. 23, 2013.

Bono, et al., "Snap and Replicate for Unified Datapath Architecture," U.S. Appl. No. 14/319,622, filed Jun. 30, 2014.

Bono, et al., "Accessing File System Replica During Ongoing Replication Operations," U.S. Appl. No. 14/492,241, filed Sep. 22, 2014.

* cited by examiner

UNIFIED DATA PROTECTION FOR BLOCK AND FILE OBJECTS

BACKGROUND

Block-based data storage systems conventionally include programming and hardware structures to provide block-based access to storage volumes. Such systems typically support Fibre Channel, iSCSI (Internet Small Computer System Interface), and/or other block-based protocols. With any of these block-based protocols, a data storage system may receive IO (input/output) requests from "hosts," i.e., computing devices accessing the data storage system, where the IO requests (also called "host IOs") specify locations to be read from or written to in the form of LUN identifiers (logical unit number, or volume) and particular offset ranges relative to the LUNs. For responding to IOs that specify read requests, the data storage system typically maps the specified LUNs and offsets to particular locations on disk drives or electronic flash drives, reads the data stored at the mapped locations, and returns the data to the hosts. For responding to IOs that specify write requests, the data storage system performs similar mappings, but writes the data to the designated locations. The IO requests may return results indicating whether the write requests succeeded or failed. An example of a block-based data storage system is the CLARiiON® system from EMC Corporation of Hopkinton, Mass.

File-based data storage systems are also known in the art. These systems include programming and hardware structures to provide file-based access to file systems. File-based data storage systems are sometimes referred to as NAS (Network Attached Storage) systems. Such systems typically support NFS (Network File System), CIFS (Common Internet File System), SMB (Server Message Block), and/or other file-based protocols. With file-based protocols, hosts can issue read and write IO requests by specifying particular file systems, paths, and file names. Internally to the data storage system, file system directories map the files specified by the host IOs to particular sets of blocks on internal volumes, which themselves are derived from disk drives or electronic flash drives. The data storage system accesses the mapped locations and performs the requested reads or writes. An example of a file-based data storage system is the Celerra® system from EMC Corporation of Hopkinton, Mass.

SUMMARY

Block-based data storage systems and file-based data storage systems often provide similar features. For example, data protection features (e.g., snaps and replication) of block-based storage systems are similar to data protection features of file-based data storage systems. Because of the different ways that block-based systems and file-based systems are typically constructed, however, data protection features for block-based objects do not generally work for file-based objects, and vice-versa. As is known, "block-based objects" are data objects that hosts may access from a data storage system using IO requests that designate particular block locations or ranges. Examples of block-based objects include LUNs (logical unit numbers) and block-based vVols (virtual volumes), for example. Also as is known, "file-based objects" are data objects that hosts may access from a data storage system using IO requests that designate particular files or groups of files. Examples of file-based objects include file systems, VMDKs (virtual machine disks), and file-based vVols.

The inability of conventional data protection features to work for both block-based objects and file-based objects has led to a proliferation of software technologies. For example, block-based snap technologies and block-based replication technologies have been provided for block-based data storage systems, whereas file-based snap technologies and file-based replication technologies have been provided for file-based data storage systems. The large number of software technologies can present difficulties to system administrators, who often need to obtain, learn, and maintain them. What is desired is thus a set of data protection technologies that work for both block-based objects and file-based objects.

In contrast with the many separate technologies used by conventional systems for protecting block-based objects and file-based objects, an improved technique for protecting host data includes storing both block-based objects and file-based objects in a common form—as files. Thus, for example, LUNs, block-based vVols, file-based vVols, file systems, and/or VMDKs are stored as respective files. With both block-based objects and file-based objects represented as the same type of underlying objects (files), data protection of both block-based and file-based objects is accomplished using a single set of data protection technologies, which are configured to perform data protection operations on files. The improved technique thus avoids the need for separate data protection technologies for block-based objects and file-based objects.

In accordance with improvements hereof, certain embodiments are directed to a method of protecting host data in a data storage apparatus. The method includes storing a block-based host data object in a first lower-deck file belonging to a set of lower-deck file systems of the data storage apparatus, and storing a file-based host data object in a second lower-deck file belonging to the set of lower-deck file systems of the data storage apparatus. The method further includes operating a data protection manager on the first lower-deck file to create a snap of the block-based host data object, and operating the data protection manager on the second lower-deck file to create a snap of the file-based host data object.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for protecting host data includes storing both block-based objects and file-based objects in the form of files. With both block-based objects and file-based objects represented as the same type of underlying objects (files), data protection of both block-based and file-based objects is accomplished using a single set of data protection technologies, which are configured to perform data protection operations on files.

Figure 1:
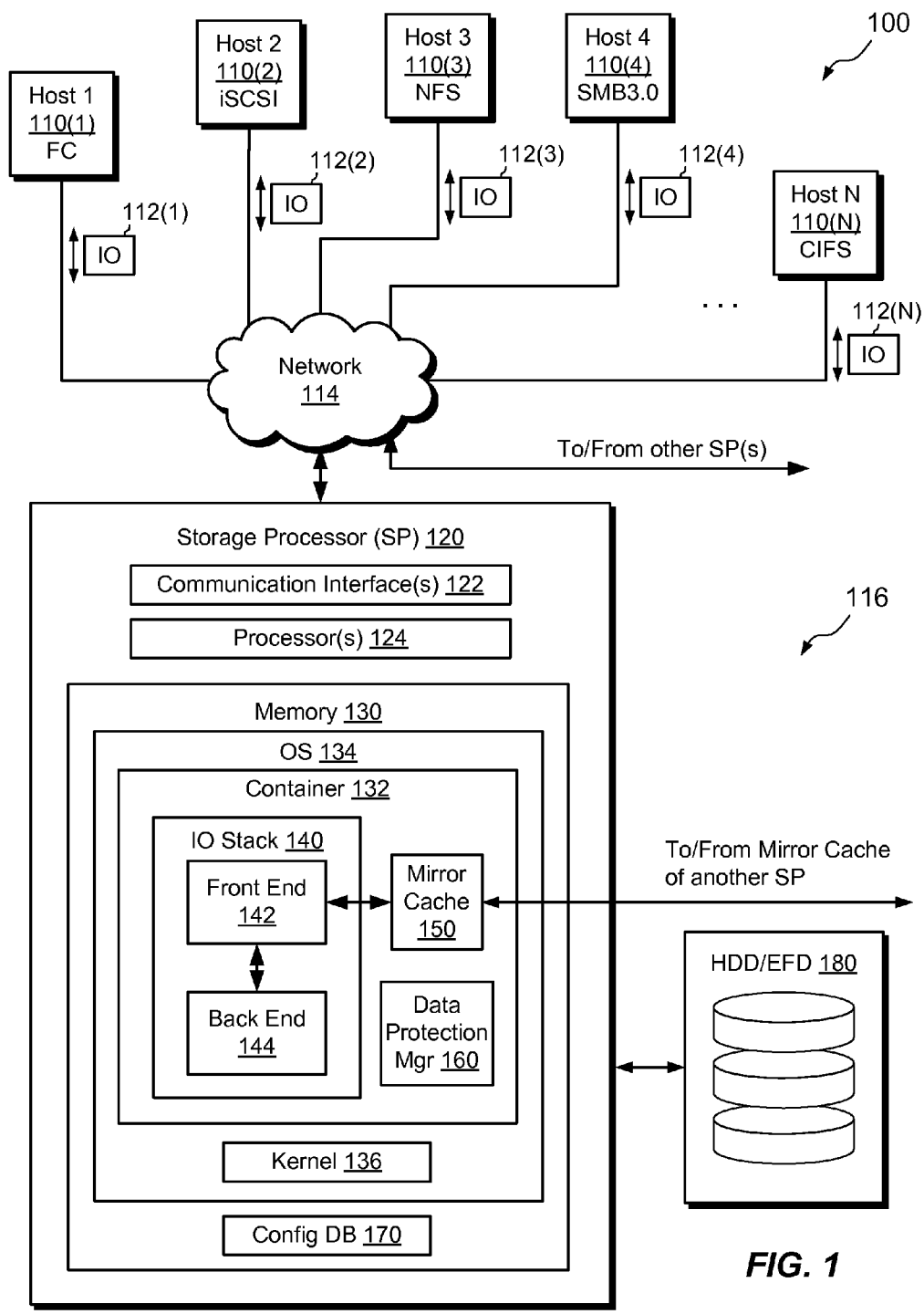
FIG. 1 is a block diagram showing an example storage processor of a data storage apparatus in an example environment wherein improved techniques hereof may be practiced.

Environment Including Unified Datapath Architecture:

FIG. 1 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives and/or electronic flash drives. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a data protection manager 160. The IO stack 140 provides an execution path for host IOs (e.g., 112(1-N)) and includes a front end 142 and a back end 144. The mirror cache 150 stores data for incoming writes and mirrors the data to cache on another SP. The data protection manager 160 makes local and/or remote copies of data for incoming writes. As the IO stack 140, mirror cache 150, and data protection manager 160 all run within the same container 132, the IO stack 140, mirror cache 150, and data protection manager 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 2:
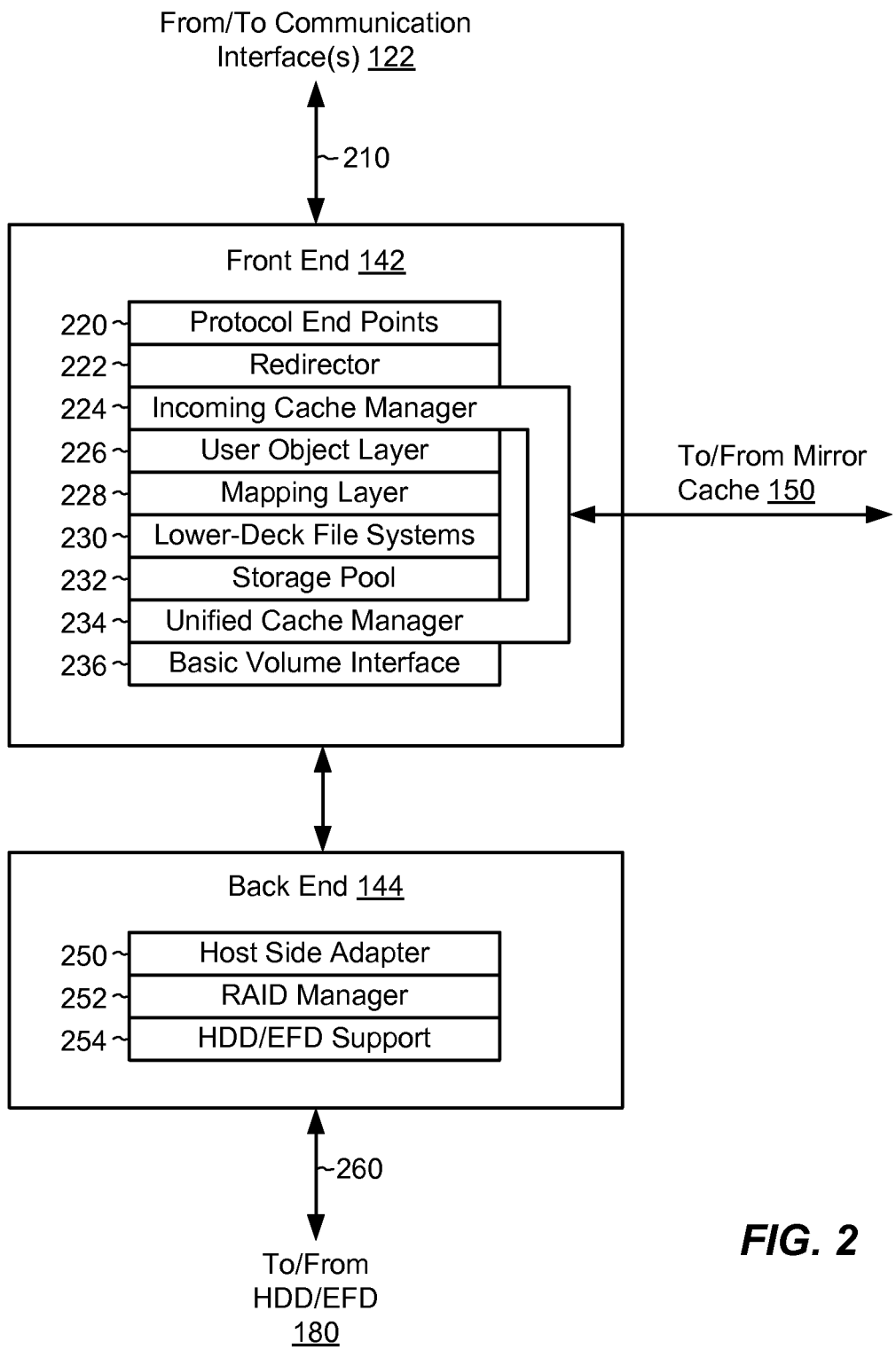
FIG. 2 is a block diagram showing particular example features of the storage processor of FIG. 1, including features of a front end and a back end of an IO stack.

FIG. 2 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
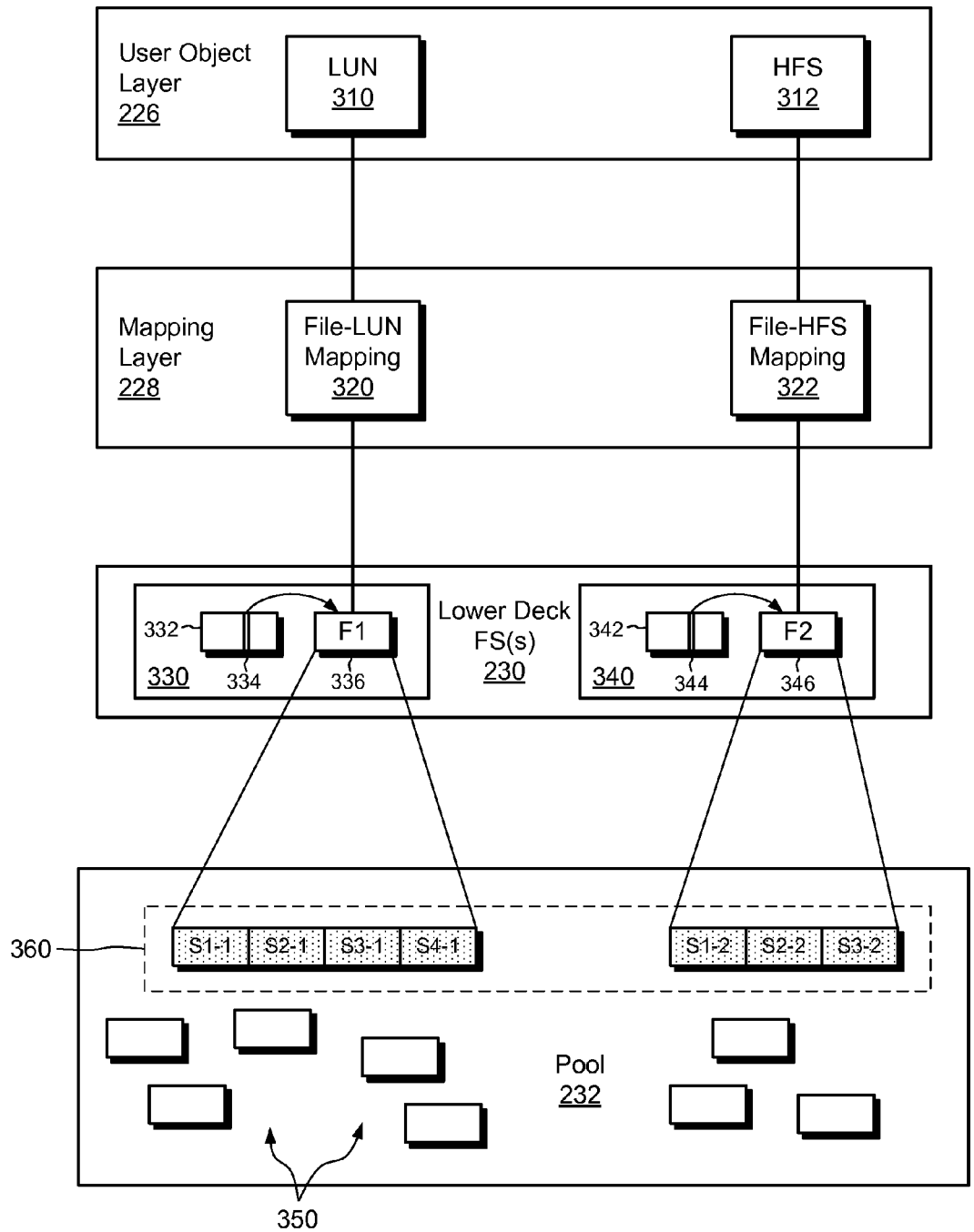
FIG. 3 is a block diagram showing example features of the front end of FIG. 2 in additional detail, including lower-deck file systems built upon storage units (e.g., slices) from a storage pool.

FIG. 3 shows portions of the front end 142 in additional detail. Here, the user object layer 226 includes a representation of a LUN 310 and of an HFS (host file system) 312, and the mapping layer 228 includes a LUN-to-file mapping 320 and a HFS-to-file mapping 322. The LUN-to-file mapping 320 maps the LUN 310 to a first file F1 (336), and the HFS-to-file mapping 322 maps the HFS 312 to a second file F2 (346). Through the LUN-to-file mapping 320, any set of blocks identified in the LUN 310 by a host IO is mapped to a corresponding set of blocks within the first file 336. Similarly, through the HFS-to-file mapping 322, any file or directory of the HFS 312 is mapped to a corresponding set of blocks within the second file 346.

The first file 336 and the second file 346 are included within the lower-deck file systems 230. In this example, a first lower-deck file system 330 includes the first file 336 and a second lower-deck file system 340 includes the second file 346. Each of the lower-deck file systems 330 and 340 includes an inode table, 332 and 342, respectively. The inode tables 332 and 342 provide information about files in respective lower-deck file systems in the form of inodes. For example, the inode table 332 of the first lower-deck file system 330 includes an inode 334, which provides file-specific information about the first file 336. Similarly, the inode table 342 of the second lower-deck file system 340 includes an inode 344, which provides file-specific information about the second file 346. The information stored in each inode includes location information (e.g., block locations) where the respective file is stored, and may thus be accessed as metadata to identify the locations of the files 336 and 346.

Although a single file is shown for each of the lower-deck file systems 330 and 340, it is understood that each of the lower-deck file systems 330 and 340 may include any number of files, each with its own entry in the respective inode table. In one example, each lower-deck file system stores not only the file F1 or F2 for the LUN 310 or HFS 312, but also snaps of those objects. For instance, the first lower-deck file system 330 stores the first file 336 along with a different file for every snap of the LUN 310. Similarly, the second lower-deck file system 340 stores the second file 346 along with a different file for every snap of the HFS 312.

As shown, a set of slices 360 is allocated by the storage pool 232 for storing the first file 336 and the second file 346. In the example show, slices S1-1 through S4-1 are used for storing the first file 336, and slices S1-2 through S3-2 are used for storing the second file 346. The data that make up the LUN 310 are thus stored in the slices S1-1 through S4-1, whereas the data that make up the HFS 312 are stored in the slices S1-2 through S3-2. In an example, the storage pool 232 allocates slices 350 to the set of file systems 230 in an on-demand manner, e.g., as the first file 236 and the second file 246 require additional storage. The storage pool 232 can also deallocate slices from the set of file systems 230 when all the currently allocated slices are no longer required.

In some examples, each of the lower-deck file systems 330 and 340 is associated with a respective volume, such as a sparse LUN. Sparse LUNs provide an additional layer of mapping between the lower-deck file systems 230 and the pool 232 and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety.

The incorporated patent uses the term "container file systems" to refer to constructs similar to the lower-deck file systems disclosed herein.

Figure 4A:
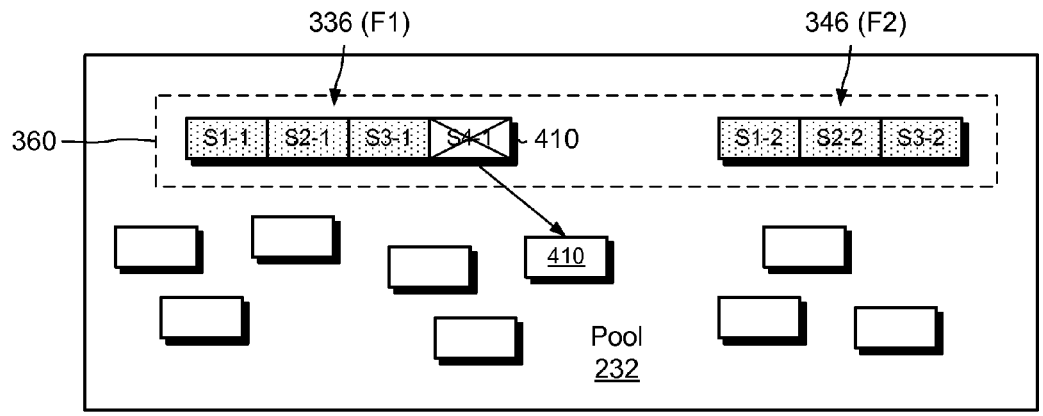
FIGS. 4A-4C are a series of block diagrams showing an example way in which a slice used to store a first file representing a LUN is reallocated for use by a second file representing a host file system.
Figure 4B:
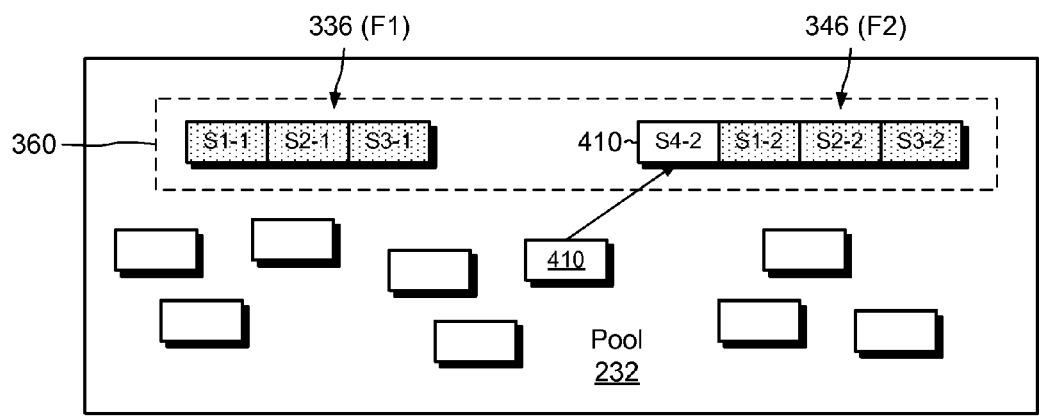
Figure 4C:
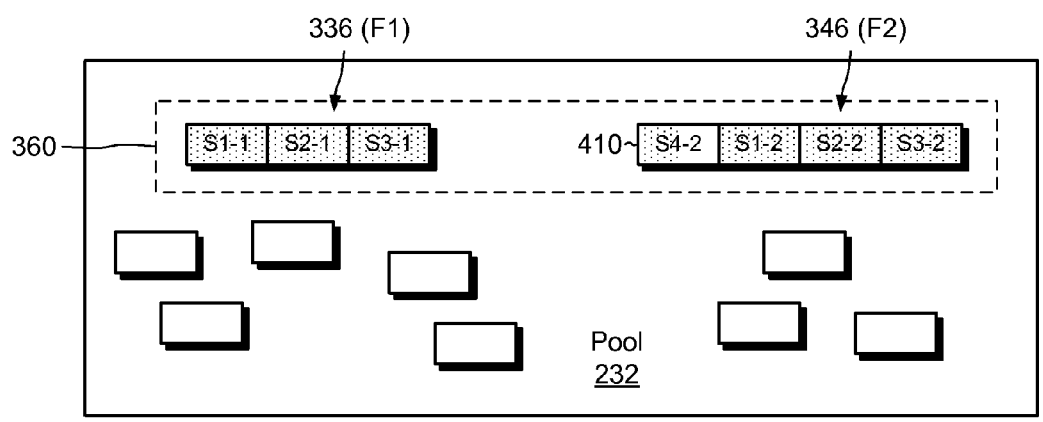

FIGS. 4A-4C show a sequence of events for reusing a slice 410 that once stored portions of the first file 336 for storing portions of the second file 346 when the slice 410 is no longer required by the first file 336. In FIG. 4A, it is shown that slice S4-1 (also labeled 410), which previously stored data for the first file 336, has become empty. This may occur, for example, when data is deleted from the LUN 310. In response to the slice S4-1 (410) becoming empty, the storage pool 232 deallocates the slice 410 from the set of file systems 230 and makes the slice 410 available.

In FIG. 4B, the free slice 410 is reallocated to the set of file systems 230 for use by the second file 346. Thus, the slice 410 becomes a newly added slice S4-2. In an example, the pool 232 reallocates the slice 410 to the set of file systems in response to the second file 346 requiring additional storage. This may occur, for example, in response to the HFS 312 growing to accommodate additional, or larger, files.

In FIG. 4C, with the first file 346 still storing data for the LUN 310, the slice 410 has become part of the second file 346 (as slice S4-2) and additional data for the second file 346 are stored on the newly acquired slice.

In the manner shown, a slice first used by the LUN 310 is reused by the HFS 312. Thus, storage space originally used for storing block-based data is reused for storing file-based data. Although FIGS. 4A-4C show block-based storage being reused for file-based storage, it is evident that file-based storage can also be reused for block-based storage. For example, the slice 410 can be released from the second file 346 and reused by the first file 336. Thus, inefficiencies of stranded storage are significantly reduced or eliminated.

Figure 5:
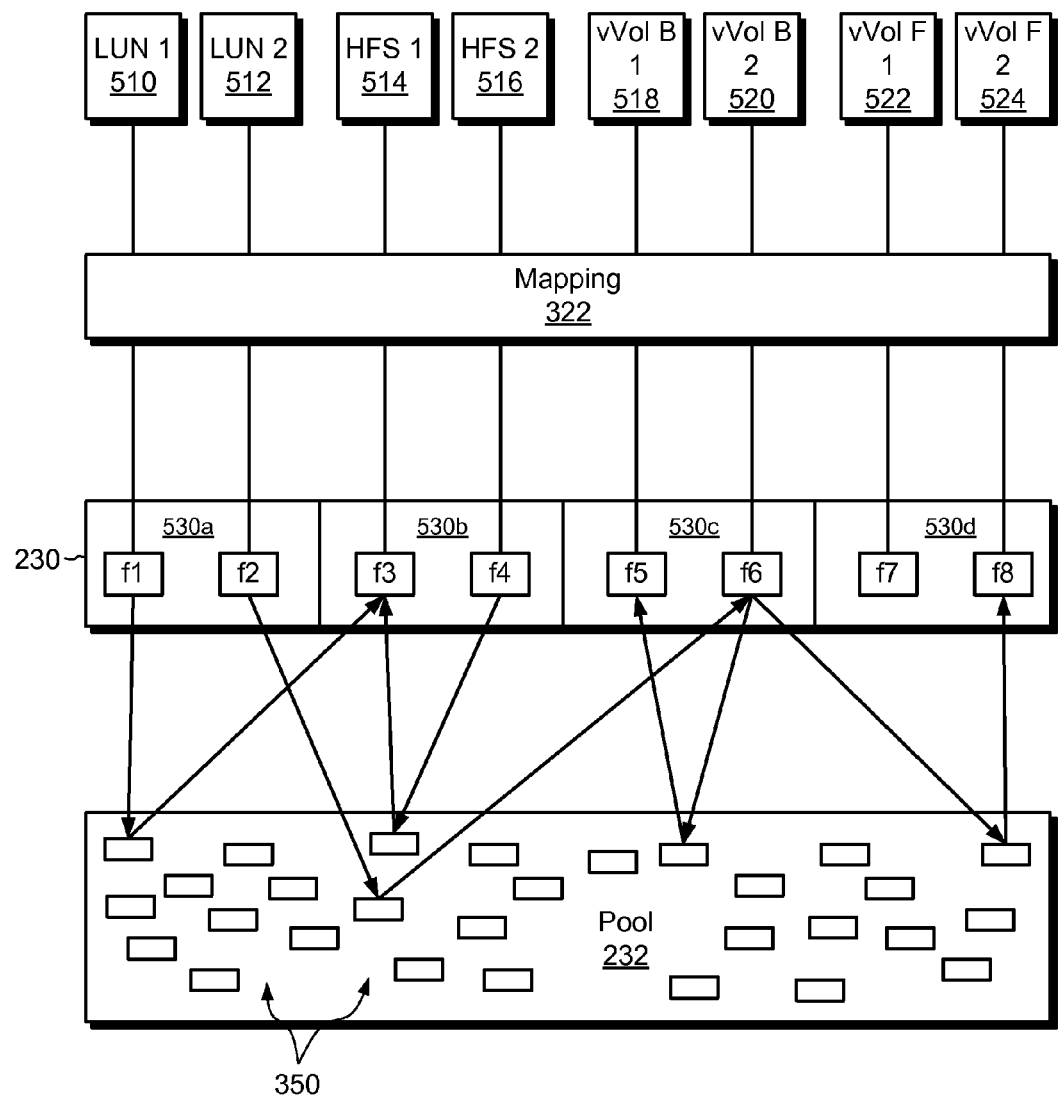
FIG. 5 is a block diagram showing an example manner in which storage slices from the storage pool can be reused by different files of the lower-deck file systems.

FIG. 5 shows a flexible manner in which files of lower-deck file systems can store a variety of host objects and how slices can be readily reused across different files. Here, files f1 and f2 within a lower-deck file system 530a store file representations of LUNs 510 and 512. Also, files f3 and f4 within a lower-deck file system 530b store file representations of host file systems 514 and 516. Additional host objects are stored, including block-based vVols 518 and 520 in files f5 and f6 (in a lower-deck file system 530c), and file-based vVols 522 and 524 in files f7 and f8 (in a lower-deck file system 530d). As is known, vVols are virtual storage volumes that are associated with particular virtual machines. In an example, any of the hosts 110(1-N) may run a virtual machine, which references a vVol stored on the data storage apparatus 116.

As illustrated with the arrows extending between the files f1 through f8 and slices 350 in the pool 232, slices used for any of the files f1 through f8 can be deallocated when they are no longer needed and reallocated for use with other files as those files require additional storage. As all host objects (e.g., LUNs, host file systems, block-based vVols, or file-based vVols) are represented as files, slices may be readily exchanged among them. Stranded storage is thus reduced or avoided altogether for all of these host object types.

Figure 6A:
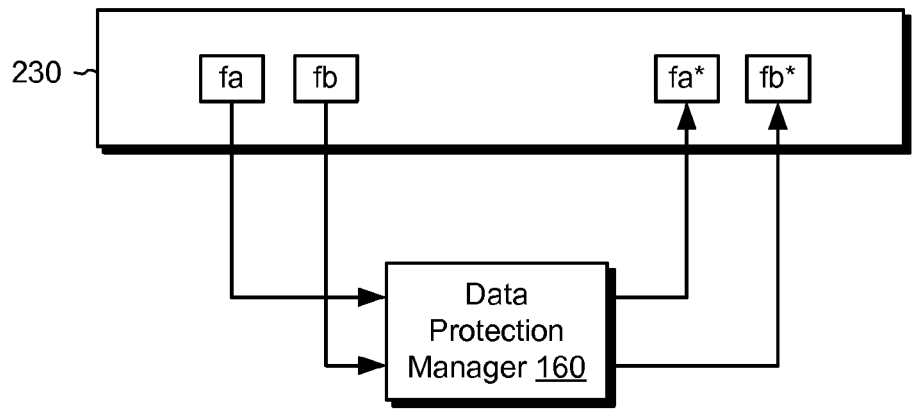
FIGS. 6A and 6B show different example replication operations on files of a lower-deck file system by a data protection manager.
Figure 6B:
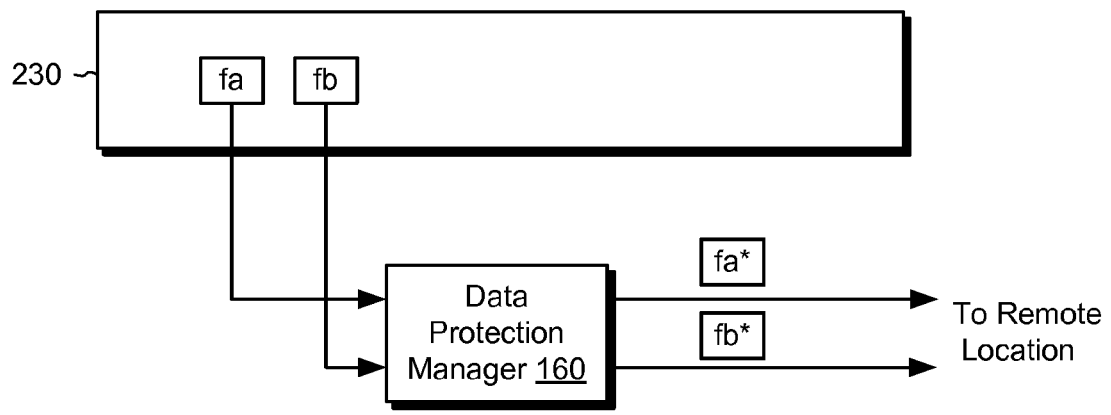

FIGS. 6A and 6B show different uses of the data protection manager 160. The data protection manager 160 performs data protection operations on host objects by copying and/or snapping their underlying files to local and/or remote locations.

In FIG. 6A, the data protection manager 160 copies or snaps a file "fa," which represents a LUN in the set of file systems 230 to produce another file "fa*" in the set of file systems 230. The file "fa*" may be a copy or a snap of the file "fa." The data protection manager 160 also copies or snaps a file "fb," which represents a host file system in the set of file systems 230 to produce another file "fb*" in the set of file systems 230. As shown, the same data protection manager 160 performs similar functions (file copies) in both situations, for providing data protection for both a LUN and a host file system.

In FIG. 6B, the data protection manager 160 performs similar copy and/or snap operations on the files "fa" and "fb," but in this case provides copies or snaps "fa*" and "fb*" to a remote location, i.e., a location remote from the data storage apparatus 116. The remote copies and/or snaps thus provide data protection for the LUN represented by "fa" and for the host file system represented by "fb" even in the event of a natural disaster in the vicinity of the data storage apparatus 116.

In some examples, the data protection manager 160 can operate in both a "sync" mode and an "async" mode. In sync mode, the data protection manager 160 performs a remote replication "in sync" with receiving write IO requests. For example, in response to a host IO request specifying data to be written, the data protection manager 160 attempts to write the host data to a remote storage point (e.g., to a RecoverPoint Appliance) and only acknowledges the write back to the originating host after both the write to the remote storage point and the local write have been acknowledged. In async mode, by contrast, a host IO request specifying a write is acknowledged back to the originating host as soon as the host data are successfully received (e.g., as soon as they are stored in the mirror cache 150 and mirrored to another SP). A local or remote copy is then made of the host object (LUN, host file system, etc.) asynchronously, i.e., out of band, with incoming write IO requests.

Although not specifically shown, other functions besides replication are also greatly simplified by representing LUNs, file systems, and other host objects in the form of files. For example, functions such as snapping, de-duplication, migration, failover, and non-disruptive upgrade are similarly benefited by the ability to commonly treat host objects as files.

In addition to the operations described above, the SP 210 can also perform advanced data services. For example, the configuration database 170 (FIG. 1) may store records defining one or more virtualized storage processors. A "virtualized storage processor" is a collection of definitions, file systems, settings, and interfaces, which can be instantiated on an SP (i.e., on a physical SP) to realize an entity that acts like its own SP. Multiple virtualized storage processors can be instantiated on a physical SP (e.g., the SP 210) to effectively multiply the number of storage processors of the data storage apparatus 116.

Figure 7:
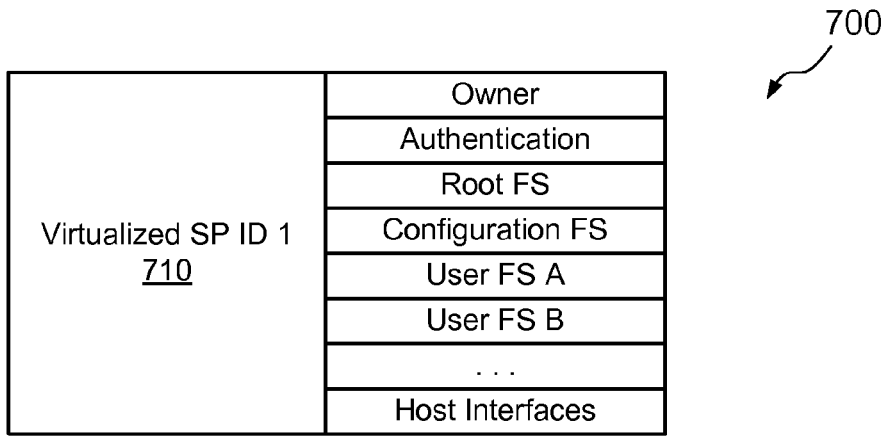
FIG. 7 is a table showing an example set of records stored in a configuration database that defines a virtualized storage processor that can be run on the storage processor of FIG. 1.

FIG. 7 shows an example set of records 700 in the configuration database 170 that define a virtualized storage processor 710. The records specify, for example, an owning SP, authentication, and file system identifiers for the virtualized storage processor 710, including identifiers of a root file system, a configuration file system, and various user file systems that may be accessed using the virtualized storage processor 710. The records may further specify various host interfaces that define host IO protocols that the virtualized storage processor 710 is equipped to handle.

The set of records 700 thus identifies not only user file systems, but also a set of interfaces and settings that form a "personality." This personality enables the virtualized storage processor 710 to interact with hosts in a manner similar to the way a physical storage processor interacts with hosts.

Although the set of records 700 is shown to define only a single virtualized storage processor 710, it is understood that the configuration database 170 may store any number of virtualized storage processor definitions for instantiating any number of virtualized storage processors on the data storage apparatus 116. The virtualized storage processors are instantiated with their respective host interfaces, and can each respond to host IO requests for reading and writing data of their respective file systems, which data are stored in the storage 180.

It is understood that virtualized storage processors operate in connection with the front end 142 of the IO stack 140. The virtualized storage processors thus remain with their respective front ends 142 in modular and gateway arrangements. The file systems that belong to a virtualized storage processor are stored as files in the lower-deck file systems 230, in the manner described above for host file systems. Indeed, in some arrangements, all host file systems implemented in the data storage apparatus 116 belong to one or more virtualized storage processors and are accessed through the virtualized storage processor(s). In some examples, multiple virtualized storage processors share the same front end IO stack 142. In other examples, each virtualized storage processor includes its own separate instance of the front end IO stack 142.

In an example, virtualized storage processors are instantiated within containers (e.g., container 132). For example, a single container may host any number of virtualized storage processors.

Figure 8A:
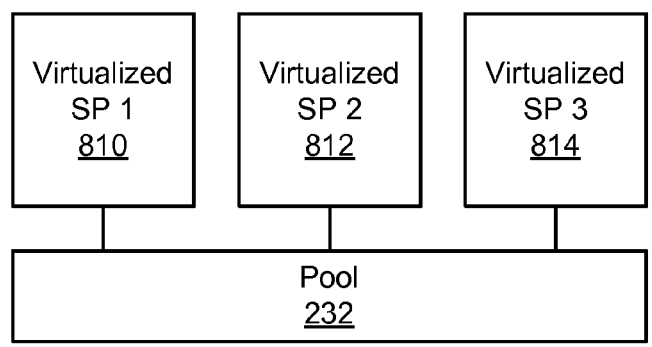
FIGS. 8A and 8B are block diagrams showing example arrangements of virtualized storage processors.
Figure 8B:
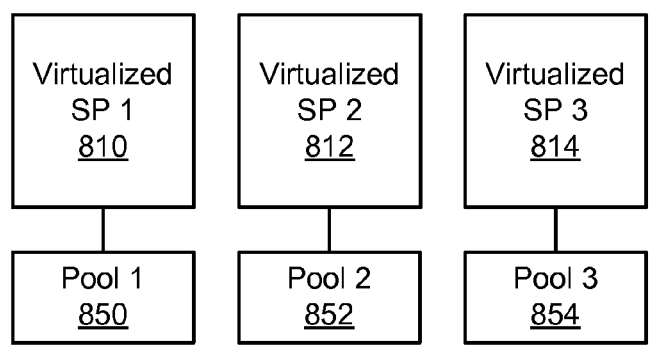

FIGS. 8A and 8B show two different example arrangements of virtualized storage processors. In both cases, the virtualized storage processors run within the container 132 of the memory 130.

In FIG. 8A, multiple virtualized storage processors 810, 812, and 814 access the storage pool 232. Thus, the lower-deck file systems of the virtualized storage processors 810, 812, and 814 all derive the slices needed to store their underlying files from the pool 232.

In FIG. 8B, multiple storage pools 850, 852, and 854 are provided, one for each of the virtualized storage processors 810, 812, and 814, respectively. Providing different pools for respective virtualized storage processors promotes data isolation among the virtualized storage processors, and thus may be better suited for applications involving multiple tenants which require that each tenant's data be kept separate from the data of other tenants.

Figure 9:
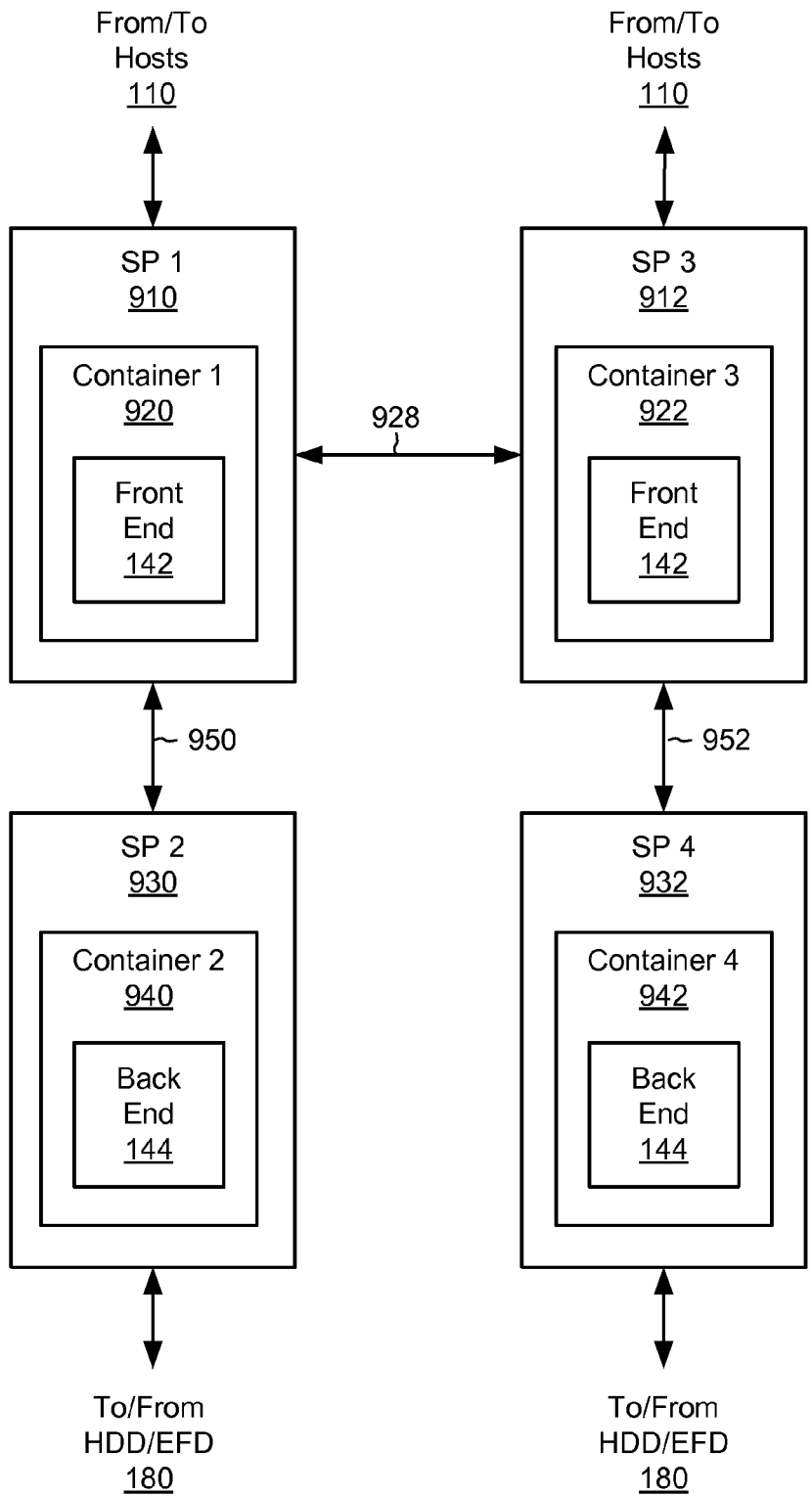
FIG. 9 is a block diagram showing an example arrangement involving three storage processors in a modular arrangement, where two storage processors are configured to run front ends and one storage processor is configured to run a back end.
Figure 10:
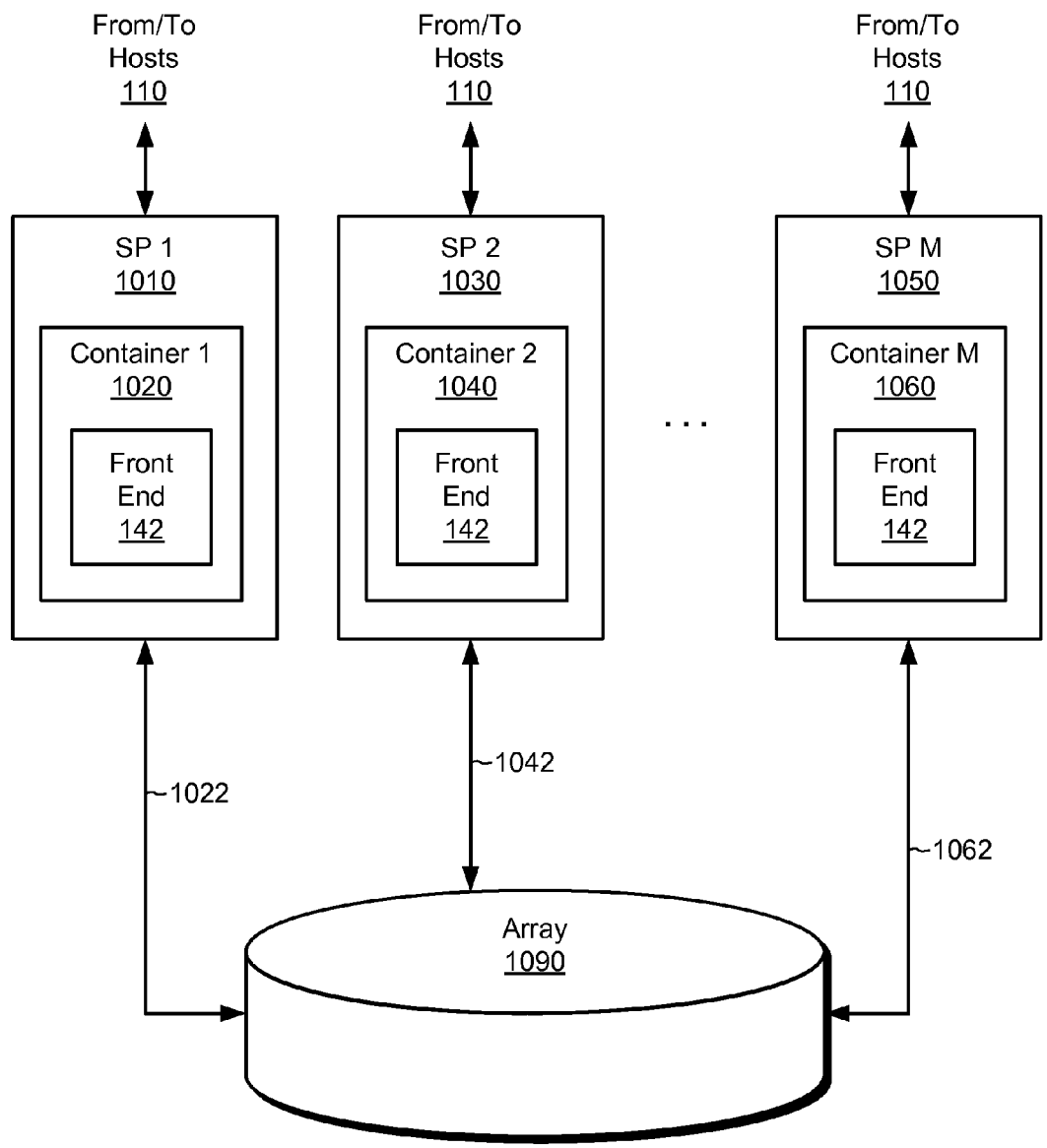
FIG. 10 is a block diagram that shows an example arrangement in which multiple storage processors run respective front ends and are connected in a gateway configuration to a data storage array.

FIGS. 9 and 10 show different deployments of the IO stack 140. In FIG. 9, a modular deployment is shown in which a first SP 910 houses a front end 142 in a first container 920 and a second SP 930 houses the back end 144 in a second container 940. An interconnection 950 is formed between the first SP 910 and the second SP 930. In an example, the interconnection 950 is made using Fibre Channel or some other block-based protocol. To support cache mirroring (via connection 928), as well as other functions, a parallel arrangement may be formed with a third SP 912 housing a front end 142 in a third container 922 and a fourth SP 932 housing a back end 144 in a fourth container 942. An interconnection 952 is formed between the third SP 912 and the fourth SP 932. With this arrangement, performance gains can be realized over the integrated configuration of FIG. 1, because the modular configuration dedicates the computing and memory resources of multiple SPs to handling host IOs, and because each SP is optimized for operating as a front end or as a back end but is not required to operate as both. Also, although the first SP 910, the second SP 930, the third SP 912, and fourth SP 932 are physical SPs, any of the SPs housing front ends 142 (SP1 and SP3) can themselves house any number of virtualized storage processors.

FIG. 10 shows a gateway arrangement, in which multiple SPs 1010, 1030, . . . , 1050 each house a front end 142 in respective containers 1020, 1040, . . . , 1060. Interconnections 1022, 1042, . . . , 1062 (such as Fibre Channel) respectively connect the SPs 1010, 1030, . . . , 1050 to an array 1090. The array 1090 includes its own internal back end, for responding to block-based IOs. Although three SPs are shown providing front ends 142, it is understood that a greater or lesser number of SPs providing front ends 142 may be provided. Also, cache mirroring and other functions may be best supported by providing SPs in pairs. Thus, the number of SPs in the gateway arrangement is preferably even. Suitable examples of the array 1090 include the VMAX® and VPLEX® storage arrays available from EMC Corporation of Hopkinton, Mass.

Figure 11:
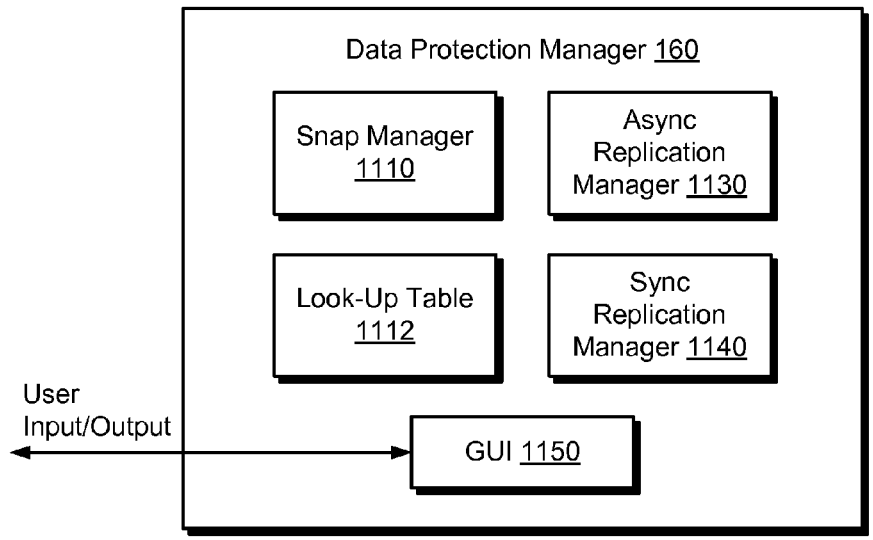
FIG. 11 is a block diagram showing an example data protection manager.

Unified Data Protection:

FIG. 11 shows additional aspects of the data protection manager 160. Here, it is seen that the data protection manager 160 includes a snap manager 1110, a set of lookup tables, such as a single lookup table 1112, an asynchronous (async) replication manager 1130, a synchronous (sync) replication manager 1140, and a graphical user interface (GUI) 1150. In some examples, different portions of the data protection manager 160 are operated on different computing devices. For example, the snap manager 1110, lookup table 1112, asynchronous replication manager 1130, and synchronous replication manager 1140 may be operated on the SP 120, whereas the GUI 1150 may be operated on a separate administrative computer (not shown), which is connected to the SP 120 via the network 114.

The snap manager 1110 manages the creation of snaps (i.e., snapshots or checkpoints) of both block-based and file-based data objects, such as LUNs, host file systems, block-based vVols, file-based vVols, VMDKs, and so forth, which are stored as respective files in the set of lower-deck file systems 230. In an example, each data object and all of its snaps are stored together as files in a respective lower-deck file system. The snap manager 1110 may apply any snapping technology that can perform snapping operations on files. Suitable examples include VNX Snapshots and SnapSure, for example, both of which are available from EMC Corporation of Hopkinton, Mass.

The lookup table 1112 stores associations between data object identifiers, such as LUNs, file system names, vVol names, and so forth, and locations of the data objects within the data storage apparatus 116. In an example, the lookup table 1112 stores, for each of multiple data objects, the data object's name, an identifier of the lower-deck file system where the data object can be found, and the name and/or inode number of the particular file within the identified lower-deck file system that stores the data object. Users may thus interact with the data protection manager 160 using the GUI 1150 by specifying objects using their customary names, whereas the replication manager 160 internally accesses the lookup table 1112 to map those names to underlying storage locations.

In some examples, the lookup table 1112 stores not only location information of data objects within the data storage apparatus 116, but also location information of snaps of those data objects. Also, although a single lookup table 1112 is shown, it is understood that multiple lookup tables may be provided. For example, a different lookup table may be provided for each type of data object, and/or different lookup tables may be provided for snaps than for the data objects on which the snaps are based.

The asynchronous replication manager 1130 performs asynchronous replication on selected data objects. In an example, the asynchronous replication manager 1130 is configured to replicate a selected data object to an asynchronous replication site on some established schedule. The asynchronous replication site may be within the data storage apparatus 116 or remote, e.g., at a different site in a different geographical location. Multiple asynchronous replication sites may be defined. The asynchronous replication manager 1130 initializes replication by copying the data object to the asynchronous replication site(s). Then, generally on a regular schedule, the asynchronous replication manager 1130 takes a snap of the data object, e.g., by invoking the snap manager 1110. The asynchronous replication manager 1130 then calculates a difference (delta) between two most recent snaps and sends the delta to the asynchronous replication site(s) for storage. In this fashion, the asynchronous replication manager 1130 maintains a replica of the data object at each of the asynchronous replication site(s). Any data object replicated in this manner can thus be recovered in the event of a failure of the SP 120 up to the time the last snap was taken.

The synchronous replication manager 1140 performs synchronous replication on selected data objects. In an example, the synchronous replication manager 1140 intercepts IO requests designating data writes within the front end 142 of the IO stack 140 (i.e., prior to writing the designated data to the storage 180). The synchronous replication manager 1140 sends the intercepted IO requests to a synchronous replication site (local or remote) and waits to receive acknowledgements from the synchronous replication site that the data designated by the IO requests have been written at the synchronous replication site before allowing the data to be written to the storage 180. In this fashion, the synchronous replication site maintains a replica of the data object, which is current and can thus be used to resume operations in the event of a failure of the SP 120 with no data loss.

The GUI 1150 receives input from a user, such as an administrator, via a keyboard, mouse or similar device, and displays output to the user, e.g., via a visual display apparatus. The GUI 1150 provides user interface features for allowing users to specify data protection operations (e.g., snaps, asynchronous replication, and synchronous replication) on selected data objects.

Figure 12:
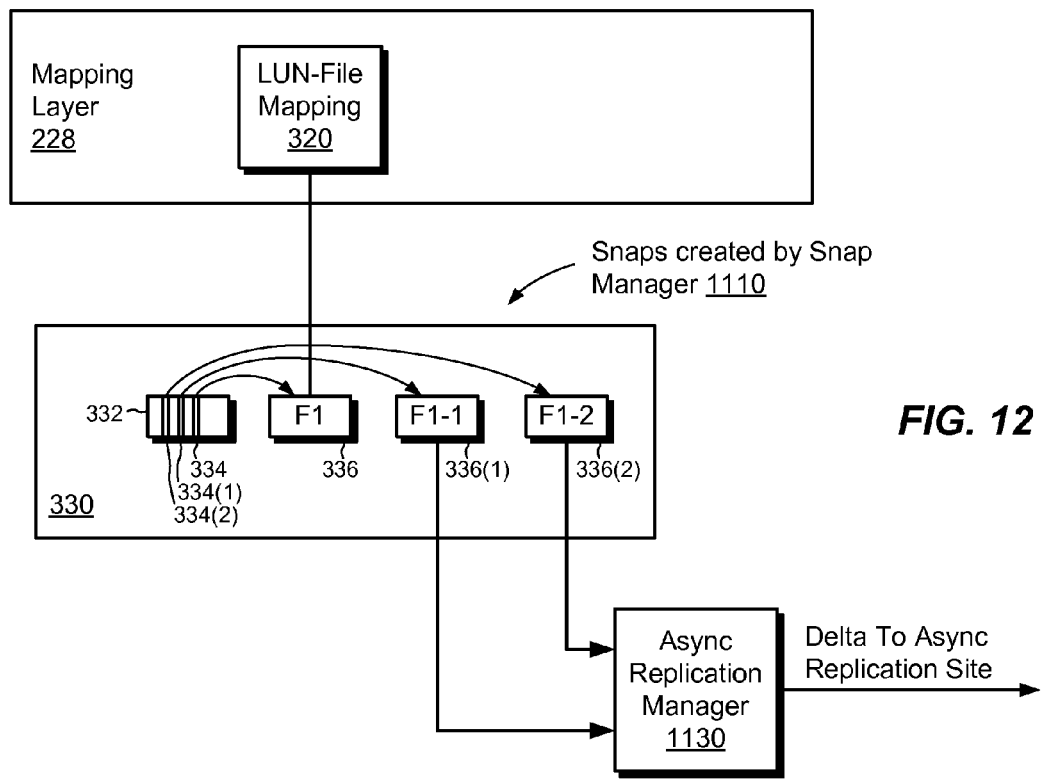
FIG. 12 is a block diagram showing example features of the front end of FIG. 2 that illustrate snaps and asynchronous replication performed on a LUN.

FIG. 12 shows an example arrangement for snapping a LUN using the snap manager 1110 and for performing asynchronous replication using the asynchronous replication manager 1130. Here, the file 336 (F1), which is shown in FIG. 3 as storing the LUN 310, has been snapped by the snap manager 1110 to create a first snap 336(1) (F1-1) of the LUN 310 and a second snap 336(2) (F1-2) of the LUN 310. Like the LUN 310, the snaps 336(1) and 336(2) of the LUN 310 are also stored as files in the lower-deck file system 330. Also, in the same way that the file 336 has an inode 334 in the inode table 332 of the lower-deck file system 330, so too do the files 336(1) and 336(2) have inodes 334(1) and 334(2), respectively in the inode table 332.

On some predetermined schedule, the snap manager 1110 creates new snaps of the LUN 310. Each time a new snap is taken, a new file 336(i) is created and a new inode 334(i) is added to the inode table 332. In an example, all snaps of the LUN 310 are stored in the lower-deck file system 330.

In the manner described above, the asynchronous replication manager 1130 operates by computing a delta between the two most recent snaps (here, 336(1) and 336(2)) and sending the delta to the asynchronous replication site. More generally, each time a new snap 336(i) is created, the asynchronous replication manager 1130 computes a new delta based on the most recent snap 336(i) and the immediately preceding snap 336(i−1) and sends the new delta to the asynchronous replication site.

Although the asynchronous replication manager 1130 is seen to operate on snaps 336(1) and 336(2) created by the snap manager 1110, this is merely an example. Alternatively, the asynchronous replication manager 1130 may generate its own internal snaps, and base its delta calculations on differences between its two most recent internal snaps. Allowing the asynchronous replication manager 1130 to operate based on its own internal snaps decouples snapping from replication and may thus provide flexibility in some circumstances.

Although FIG. 12 shows an example where the LUN 310 is snapped and asynchronously replicated, it is evident that the snapping and replicating techniques are based on files and are thus agnostic to the content of those files, i.e., they are agnostic to whether the files store LUNs, block-based vVols, or other block-based objects. Indeed, the snapping and replicating techniques shown in FIG. 12 work equally well for file-based objects.

Figure 13:
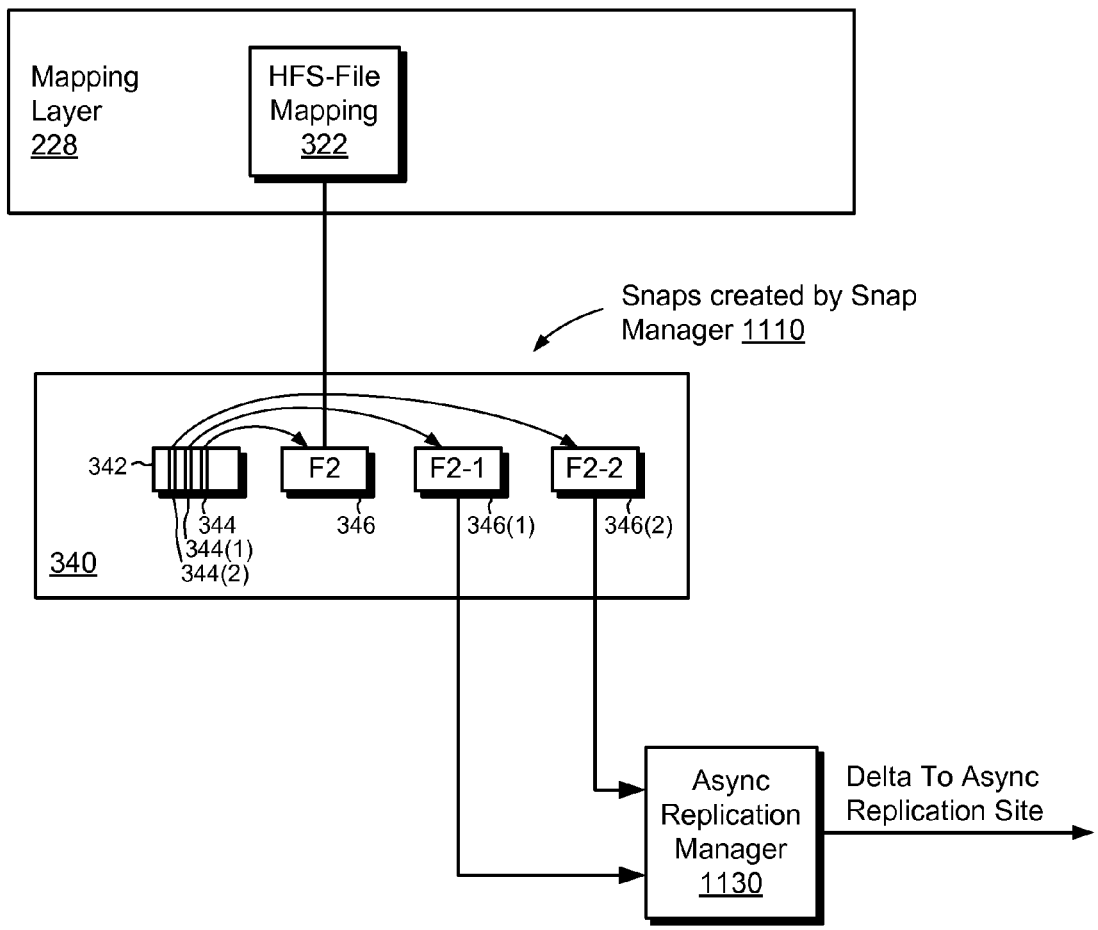
FIG. 13 is a block diagram showing example features of the front end of FIG. 2 that illustrate snaps and asynchronous replication performed on a host file system.

FIG. 13 shows an example arrangement for snapping a host file system (HFS) using the snap manager 1110 and for performing asynchronous replication of the HFS using the async replication manager 1130. Here, the file 346 (F2), which is shown in FIG. 3 as storing the HFS 312, has been snapped by the snap manager 1110 to create a first snap 346(1) (F2-1) of the HFS 312 and a second snap 346(2) (F2-2) of the HFS 312. The snaps 346(1) and 346(2) of the HFS 312 are stored together with the HFS 312 as files in the lower-deck file system 340. Also, in the same way that the file 346 has an inode 344 in the inode table 342 of the lower-deck file system 340, so too do the files 346(1) and 346(2) have inodes 344(1) and 344(2), respectively in the inode table 342.

Because the HFS 312 and its snaps are stored in the form of files, snapping and asynchronously replicating the HFS 312 proceeds in the same manner as snapping and replicating the LUN 310. The snapping and replicating techniques are based on files and are thus agnostic to the content of those files, i.e., they are agnostic to whether the files store HFSs, file-based vVols, VMDKs, other file-based objects, or block-based objects.

Figure 14:
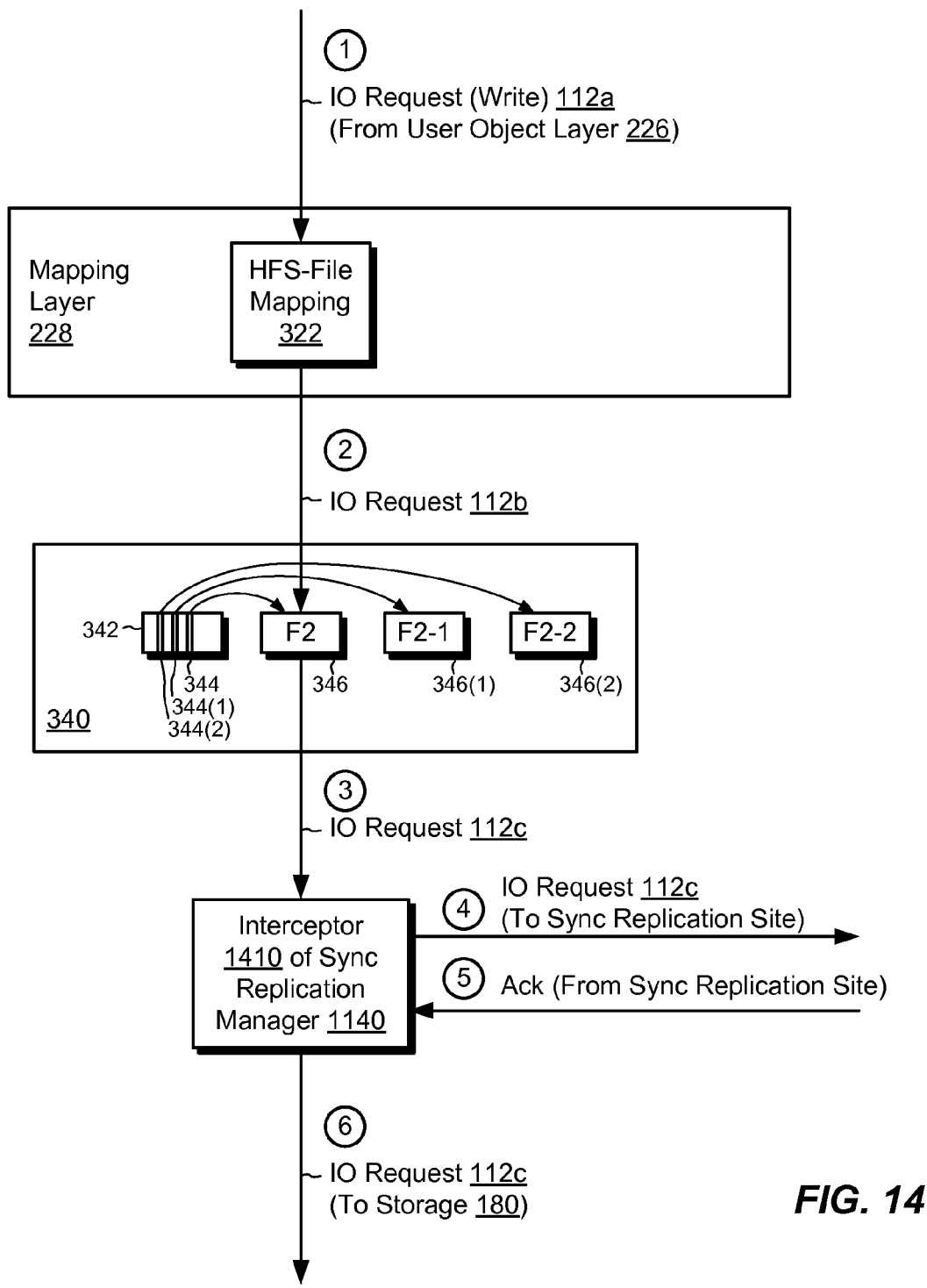
FIG. 14 is a block diagram showing example features of the front end of FIG. 2 that illustrate synchronous replication performed on a host file system.

FIG. 14 shows an example arrangement for synchronously replicating the host file system 312 using the sync replication manager 1140. Here, an interceptor 1410 is interposed in the front end 142 of the IO stack 140 below the mapping layer 228. The interceptor 1410 is part of the sync replication manager 1140 and serves to intercept incoming IO write requests.

The encircled numbers indicate an example sequence. Beginning at (1), an IO request 112a, which designates a data write operation (e.g., of designated data to a particular file), has reached the mapping layer 228 after arriving at the SP 120 and propagating through a portion of the front end 142. At this level, for example, the IO request 112a may include a file name and path information relative to the HFS 312, i.e., relative to the file system that the host originating the IO request recognizes.

At (2), the IO request 112a has been transformed into an IO request 112b. The IO request 112b no longer includes the file name or path information relative to the HFS 312, but rather may include a file name (or simply an inode number) of the file 346 (F2) within the lower-deck file system 340. At this level of the front end 142 of the IO stack 140 (and below), the IO request has been rendered in a form that is agnostic to the particular content of the file 346, i.e., the HFS-to-File mapping 332 has rendered the IO request 112b so that it points to a particular location within the file 346 and need not include any HFS-specific location information.

At (3), the IO request 112b emerges as IO request 112c, which may include additional mapping information provided by the lower-deck file system layer 230. Here, the IO request 112c encounters the interceptor 1410, which intercepts the IO request 112c and prevents, usually temporarily, the IO request 112c from propagating further down the IO stack 140.

At (4), the interceptor 1410 sends the IO request 112c to a synchronous replication site. This site may be the same as the asynchronous replication site described in connection with FIGS. 12 and 13, or it may be different.

At (5), the interceptor 1410 receives an acknowledgement from the synchronous replication site. The acknowledgement indicates that the IO request 112c was successfully executed at the synchronous replication site, i.e., the data designated by the IO request 112c was persisted at the synchronous replication site. If the synchronous replication site cannot successfully persist the data designated by the IO request 112c, the interceptor 1410 will not receive an acknowledgement and may generate an error message. Processing of the IO request may then cease.

At (6), and assuming that the interceptor 1410 received the acknowledgement, the interceptor 1410 allows the IO request 112c to continue propagating down the IO stack 140, where it may be persistently cached (e.g., by the unified cache manager 234) and/or stored in the storage 180. Further acknowledgements (not shown) may then be sent back up the IO stack 140 to confirm execution of the IO request.

Although FIG. 14 shows the interceptor 1410 operating to synchronously replicate an HFS, it is evident that the interceptor 1410 may be operated as shown to replicate any file-based data object or any block-based data object. The position of the interceptor 1410 below the mapping layer 228 ensures that the interceptor 1410 receives IO requests that are agnostic to the particular type of data object stored in the lower-deck file. Also, it is evident that the interceptor 1410 may be placed in any suitable location below the mapping layer 228 and to achieve its object-agnostic behavior. The exact location of the interceptor below the mapping layer 228 is a matter of design choice.

Figure 15:
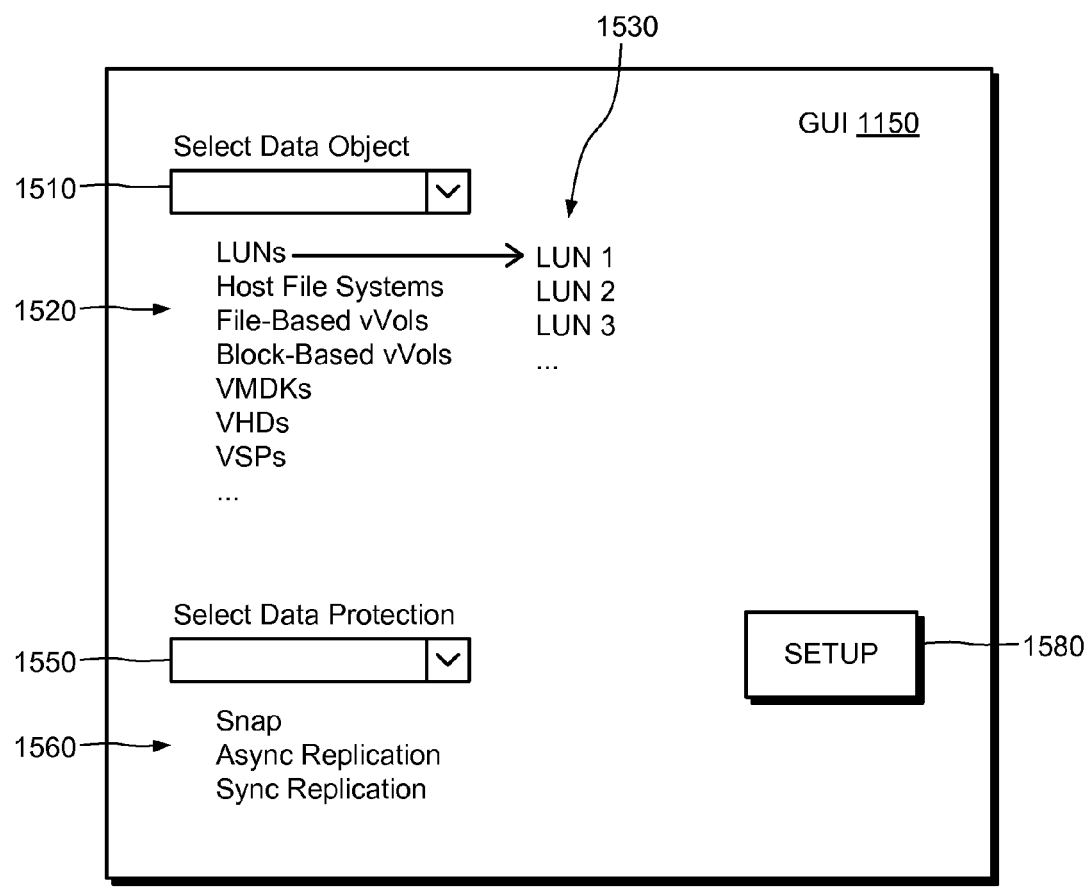
FIG. 15 is a simulated screenshot showing an example graphical user interface (GUI) of the data protection manager.

FIG. 15 shows an example screen shot of the GUI 1150 of the data protection manager 160. It is understood that the screenshot is shown in simplified form and is intended to be merely illustrative. Here, the GUI 1150 includes a control 1510 for selecting a data object. In an example, a user clicks the control 1510 to reveal a list of possible objects. The objects may be organized in two levels—a first level 1520 that specifies different data object types and a second level 1530 that specifies particular data objects of each type. The user clicks the control 1510 and positions the pointer over a data object type displayed in the first level 1520 to select the data object type the user wishes to configure. In response to the pointer being positioned over the desired data object type, the second level 1530 is displayed listing all data objects of the selected type in the data storage apparatus 116. A different list is displayed in the second level 1530 for each selection in the first level 1520. The user then clicks to select a particular data object.

The user may next click a control 1550 to select a particular data protection operation. Example choices are displayed in list 1560 and may include snap, asynchronous replication, and synchronous replication. The user may next click a button 1580 ("SETUP") to configure settings of the selected data protection choice for the selected data object. A new page (not shown) may be displayed for configuring the selected data protection operation on the selected data object. Settings may include, for example, frequencies of snaps, frequencies of asynchronous replication, and replication sites. Once settings are established, the data protection manager 160 puts the settings into effect by scheduling and executing the selected data protection operations on the selected objects in accordance with the user-established settings.

As shown at the first level 1520 of the GUI 1150, the available choices of data object types on which data protection operations may be configured include VSPs. VSPs are described hereinabove in connection with FIGS. 7, 8A, and 8B. As described by example above, each VSP includes a root file system, a configuration file system, and a number of host file systems. VSPs can thus be regarded as aggregating objects, which group together multiple underlying data objects. Although VSPs are described above with reference to file systems, it is understood that VSPs may group together data objects of any type and in any combination. Including VSPs in the list of data object types at the level 1520 allows users to configure data protection operations for data objects on a per VSP basis rather than on an individual basis.

For example, the user may select "VSPs" under the list at level 1520 and then select a particular VSP (e.g., "VSP 1") at level 1530. The user may then select and configure a data protection operation to be performed for all data objects of the selected VSP.

For instance, the user may select and configure snaps for a selected VSP. The user may click the SETUP button 1580 to configure a desired frequency of snaps, for example. In response to the user input, the replication manager 160 applies the configured settings to all data objects included within the VSP. Thus, for example, the root file system, configuration file system, and all host file systems of the selected VSP will be snapped as prescribed by the user-established settings. Snapping of individual data objects of the VSP will be conducted as described above in connection with the snap manager 1110.

The user may also select and configure asynchronous replication for a selected VSP. For example, the user selects "Async Replication" from the list 1560 and clicks the SETUP button 1580 to configure, for example, a desired frequency of asynchronous replication and one or more asynchronous replication sites. In response to the user input, the asynchronous replication manager 1130 establishes a respective asynchronous replication session for each data object of the VSP in accordance with the user-established settings, where each replication session is conducted as described above in connection with the asynchronous replication manager 1130.

The user may also select and configure synchronous replication for a selected VSP. For example, the user selects "Sync Replication" from the list 1560 and clicks the SETUP button 1580 to configure, for example, a desired synchronous replication site. In response to the user input, the sync replication manager 1140 establishes a synchronous replication session for each data object of the VSP in accordance with the user-established settings, where each replication session is conducted as described above in connection with the sync replication manager 1140.

Figure 16:
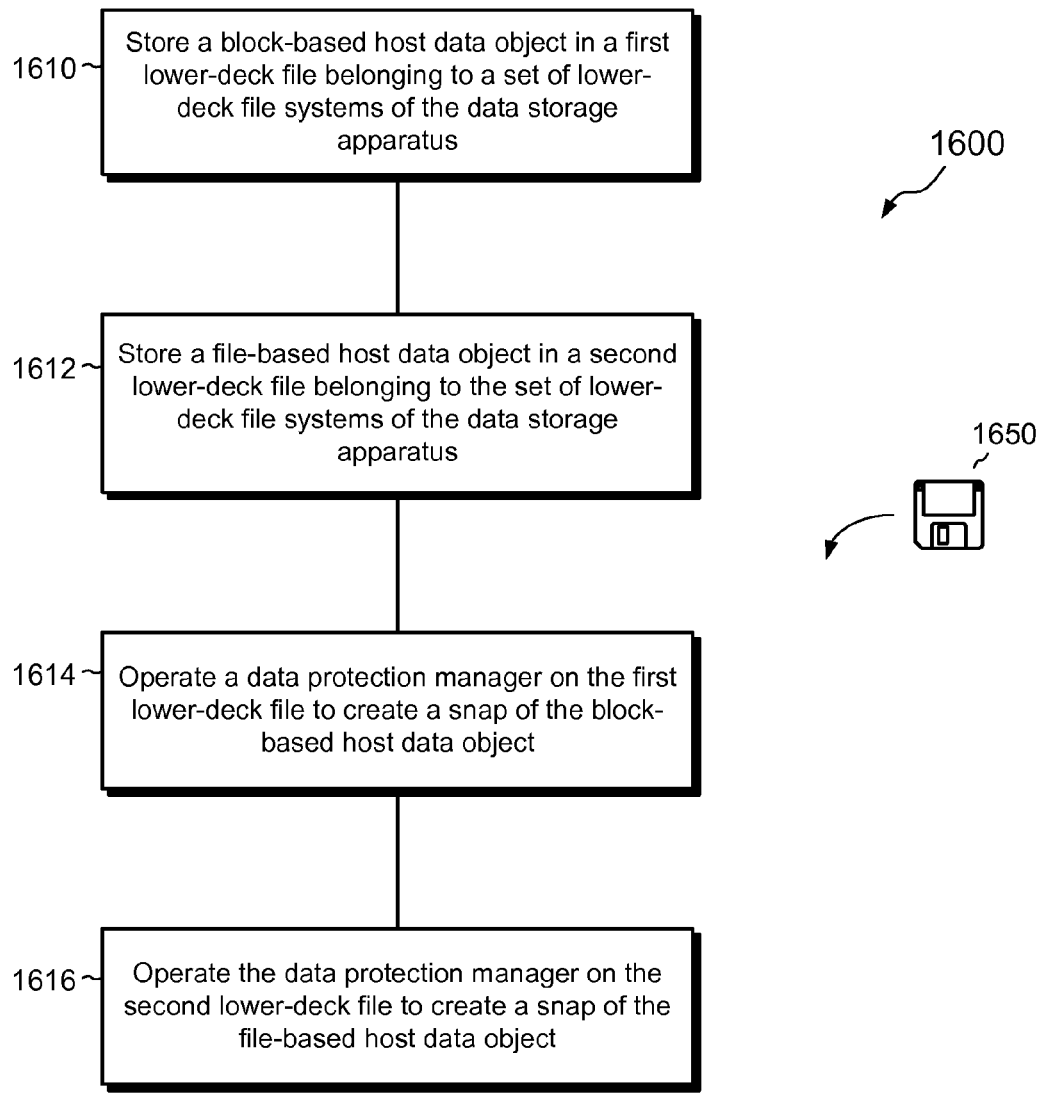
FIG. 16 is a flowchart showing an example process for protecting host data of a set of hosts in the data storage apparatus of FIG. 1.

FIG. 16 shows an example method 1600 for protecting host data in a data storage apparatus, which method may be carried out in connection with the data storage apparatus 116. The method 1600 is typically performed by the software constructs, described in connection with FIGS. 1, 2, and 11-15 which reside in the memory 130 of the storage processor 120 and are run by the set of processors 124. The various acts of the method 1600 may be ordered in any suitable way. Accordingly, embodiments may be constructed in which acts are performed in orders different from those illustrated, which may include performing some acts simultaneously, even though the acts are shown as sequential in the illustrated embodiments.

At step 1610, a block-based host data object is stored in a first lower-deck file belonging to a set of lower-deck file systems of the data storage apparatus. For example, a LUN 310, block-based vVol, or some other block-based data object is stored in a lower-deck file (e.g., file 336) in a lower-deck file system (e.g., 330) of the data storage apparatus 116.

At step 1612, a file-based host data object is stored in a second lower-deck file belonging to the set of lower-deck file systems of the data storage apparatus. For example, an HFS 312, file-based vVol, VMDK, or some other file-based data object is stored in a lower-deck file (e.g., file 346) in a lower-deck file system (e.g., 340) of the data storage apparatus 116.

At step 1614, a data protection manager is operated on the first lower-deck file to create a snap of the block-based host data object. For example, the snap manager 1110 of the data protection manager 160 is operated on the file 336 to create a snap 336(1) of the LUN 310.

At step 1616, the data protection manager is operated on the second lower-deck file to create a snap of the file-based host data object. For example, the snap manager 1110 of the data protection manager 160 is operated on the file 336 to create a snap 346(1) of the HFS 312. The same data protection manager is thus operated to perform snaps on both a block-based host data object and a file-based host data object.

An improved technique has been described for protecting host data. The technique includes storing both block-based objects and file-based objects in a common form—as files. Thus, for example, LUNs, block-based vVols, file-based vVols, file systems, and/or VMDKs may all be stored as respective files. With both block-based objects and file-based objects represented as the same type of underlying objects (i.e., files), data protection of both block-based objects and file-based objects is accomplished using a single set of data protection technologies, which is configured to perform data protection operations on files. The improved technique thus avoids the need for separate data protection technologies for block-based objects and file-based objects.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the replication manager 160 is shown and described as a single, unified tool presented through a single GUI 1150. This is merely an example, however. Alternatively, the snap manager 1110, asynchronous replication manager 1130, and/or synchronous replication manager 1140 can be provided as separate tools with separate user interfaces. Users of these separate tools would still enjoy the benefits of a reduced number of technologies as compared to prior techniques that required different technologies for block-based objects and file-based objects.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1150 in FIG. 11). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of protecting host data in a data storage apparatus, the method comprising:
    storing a block-based host data object in a first lower-deck file belonging to a set of lower-deck file systems of the data storage apparatus;
    storing a file-based host data object in a second lower-deck file belonging to the set of lower-deck file systems of the data storage apparatus;
    operating a data protection manager on the first lower-deck file to create a snap of the block-based host data object stored in the first lower-deck file; and
    operating the data protection manager on the second lower-deck file to create a snap of the file-based host data object stored in the second lower-deck file.

2. The method of claim 1, wherein the block-based data object is one of (i) a LUN (logical unit number) or (ii) a file-based vVol (virtual volume).

3. The method of claim 2, wherein the file-based data object is one of (i) a host file system, (ii) a VMDK (virtual machine disk) or (iii) a file-based vVol (virtual volume).

4. The method of claim 3, wherein the first lower-deck file belongs to a first lower-deck file system, and wherein operating the data protection manager on the first lower-deck file includes storing the snap of the block-based host data object in the first lower-deck file system.

5. The method of claim 4, wherein the second lower-deck file belongs to a second lower-deck file system, and wherein operating the data protection manager on the second lower-deck file includes storing the snap of the file-based host data object in the second lower-deck file system.

6. The method of claim 3, further comprising storing a set of lookup tables that (i) associate an identifier of the block-based host data object with a location of the first lower-deck file within the data storage apparatus, (ii) associate an identifier of the file-based host data object with a location of the second lower-deck file within the data storage apparatus, and (iii) associate identifiers of other host data objects with respective locations of lower-deck files that store the respective other host data objects.

7. The method of claim 6, further comprising:
    receiving input to the data protection manager, the input designating one of the identifiers of a host data object (i.e., i, ii, or iii of claim 6) on which a snap is to be created;
    accessing, by the data protection manager, the set of lookup tables;
    identifying, within the set of lookup tables, the lower-deck file that corresponds to the identifier of the host data object received with the input; and
    performing a snap of the lower-deck file identified within the set of lookup tables.

8. The method of claim 6, further comprising:
    receiving input to the data protection manager designating a virtualized storage processor (VSP) operating in the data storage apparatus;

identifying multiple host file systems of the VSP, each of the host file systems of the VSP having a file system identifier; and for each of the identified host file systems of the VSP, accessing, by the data protection manager, the set of lookup tables;

identifying, within the set of lookup tables, the lower-deck file that corresponds to the file system identifier; and performing a snap of the lower-deck file identified within the set of lookup tables.

9. The method of claim 3, further comprising:

operating the data protection manager to create multiple snaps of the first lower-deck file and multiple snaps of the second lower-deck file;

performing a first asynchronous replication operation on the first lower-deck file by computing a difference between a pair of snaps of the first lower-deck file and transmitting the difference to a replication site; and performing a second asynchronous replication operation on the second lower-deck file by computing a difference between a pair of snaps of the second lower-deck file and transmitting the difference to the replication site.

10. The method of claim 9, wherein the data protection manager has a graphical user interface (GUI), and wherein (i) operating the data protection manager on the first lower-deck file to create the snap of the block-based host data object, (ii) operating the data protection manager on the second lower-deck file to create the snap of the file-based host data object, (iii) performing the first asynchronous replication operation, and (iv) performing the second asynchronous replication operation are conducted by the data protection manager responsive to user input from the GUI.

11. The method of claim 10, further comprising receiving, by the GUI, one or more user input instructions directing the data protection manager to perform synchronous replication of both the block-based data object and of the file-based data object, and, in response to the user input instruction(s) and for each of the block-based data object and the file-based data object, intercepting a host input/output (IO) request designating host data to be written to the respective lower-deck file, transmitting the IO request to a synchronous replication site for storage of the host data at the synchronous replication site, receiving an acknowledgement from the synchronous replication site that the host data specified by the IO request have been written, and directing, in response to receiving the acknowledgement, the host data specified in the IO request to be written to the respective lower-deck file.

12. The method of claim 10, further comprising:

receiving, by the GUI, user input designating a virtualized storage processor (VSP) operating in the data storage apparatus;

identifying, by the data protection manager in response to receiving the user input by the GUI designating the VSP, multiple host file systems of the VSP, wherein each of the host file systems of the VSP is stored in a respective lower-deck file of the set of lower-deck file systems; and for each of the identified host file systems of the VSP, performing an asynchronous replication operation on the respective lower-deck file by computing a difference between a pair of snaps of the respective lower-deck file and transmitting the difference to a replication site.

13. The method of claim 12, further comprising receiving, by the GUI, an instruction directing the data protection manager to perform synchronous replication of the VSP and, in response to the instruction and for each of the lower-deck files storing a host file system of the VSP, intercepting a host input/output (IO) request designating host data to be written to the respective lower-deck file, transmitting the IO request to a synchronous replication site for storage of the host data at the synchronous replication site, receiving an acknowledgement from the synchronous replication site that the host data specified by the IO request have been written, and directing, in response to receiving the acknowledgement, the host data specified in the IO request to be written to the respective lower-deck file.

14. The method of claim 1, wherein the block-based data object is a LUN (logical unit number) and wherein the file-based data object is a host file system.

15. A data storage apparatus, comprising:

a storage processor including control circuitry, memory accessible by the control circuitry, and multiple hardware interfaces arranged to connect to a set of hosts to enable the set of hosts to access host data stored on the data storage apparatus, wherein the memory stores instructions which, when carried out by the control circuitry, cause the control circuitry to:

store a block-based host data object in a first lower-deck file belonging to a set of lower-deck file systems of the data storage apparatus;

store a file-based host data object in a second lower-deck file belonging to the set of lower-deck file systems of the data storage apparatus;

operate a data protection manager on the first lower-deck file to create a snap of the block-based host data object stored in the first lower-deck file; and operate the data protection manager on the second lower-deck file to create a snap of the file-based host data object stored in the second lower-deck file.

16. The data storage apparatus of claim 15, wherein the block-based data object is one of (i) a LUN (logical unit number) or (ii) a file-based vVol (virtual volume), and wherein the file-based data object is one of (i) a host file system, (ii) a VMDK (virtual machine disk) or (iii) a file-based vVol (virtual volume).

17. A computer program product having a non-transitory computer readable medium including instructions which, when executed by control circuitry of a data storage apparatus, cause the control circuitry to perform a method of protecting host data in a data storage apparatus, the method comprising:

storing a block-based host data object in a first lower-deck file belonging to a set of lower-deck file systems of the data storage apparatus;

storing a file-based host data object in a second lower-deck file belonging to the set of lower-deck file systems of the data storage apparatus;

operating a data protection manager on the first lower-deck file to create a snap of the block-based host data object stored in the first lower-deck file; and operating the data protection manager on the second lower-deck file to create a snap of the file-based host data object stored in the second lower-deck file.

18. The computer program product of claim 17, wherein the method further comprises:

storing a set of lookup tables that (i) associate an identifier of the block-based host data object with a location of the first lower-deck file within the data storage apparatus, (ii) associate an identifier of the file-based host data object with a location of the second lower-deck file within the data storage apparatus, and (iii) associate identifiers of other host data objects with respective locations of lower-deck files that store the respective other host data objects;

receiving input to the data protection manager, the input designating one of the identifiers of a host data object on which a snap is to be created;

accessing, by the data protection manager, the set of lookup tables;

identifying, within the set of lookup tables, the lower-deck file that corresponds to the identifier of the host data object received with the input; and performing a snap of the lower-deck file identified within the set of lookup tables.

19. The computer program product of claim 18, wherein the method further comprises:

operating the data protection manager to create multiple snaps of the first lower-deck file and multiple snaps of the second lower-deck file;

performing a first asynchronous replication operation on the first lower-deck file by computing a difference between a pair of snaps of the first lower-deck file and transmitting the difference to a replication site; and performing a second asynchronous replication operation on the second lower-deck file by computing a difference between a pair of snaps of the second lower-deck file and transmitting the difference to the replication site.

20. The computer program product of claim 18, wherein the method further comprises receiving one or more user input instructions directing the data protection manager to perform synchronous replication of both the block-based data object and of the file-based data object, and, in response to the user input instruction(s) and for each of the block-based data object and the file-based data object, a host input/output (IO) request designating host data to be written to the respective lower-deck file, transmitting the IO request to a synchronous replication site for storage of the host data at the synchronous replication site, receiving an acknowledgement from the synchronous replication site that the host data specified by the IO request have been written, and directing, in response to receiving the acknowledgement, the host data specified in the IO request to be written to the respective lower-deck file.

21. The computer program product of claim 18, wherein the method further comprises receiving an instruction directing the data protection manager to perform synchronous replication of a virtualized storage processor (VSP) and, in response to the instruction and for each of multiple lower-deck files storing a respective host file system of the VSP, intercepting a host input/output (IO) request designating host data to be written to the respective lower-deck file, transmitting the IO request to a synchronous replication site for storage of the host data at the synchronous replication site, receiving an acknowledgement from the synchronous replication site that the host data specified by the IO request have been written, and directing, in response to receiving the acknowledgement, the host data specified in the IO request to be written to the respective lower-deck file.

* * * * *